United States Patent [19]

Shields

[11] Patent Number: 4,575,935

[45] Date of Patent: Mar. 18, 1986

[54] METHOD AND APPARATUS FOR APPLYING A CONNECTOR HAVING AN INJECTION MOLDED COVER TO MULTICONDUCTOR CABLE

[76] Inventor: Charles E. Shields, 655 Woodland St., Crystal Lake, Ill. 60014

[21] Appl. No.: 505,915

[22] Filed: Jun. 20, 1983

Related U.S. Application Data

[63] Continuation-in-part of Ser. No. 351,595, Feb. 23, 1982.

[51] Int. Cl.[4] ........................ H01R 43/00; B23P 19/00

[52] U.S. Cl. ........................................ 29/858; 29/749; 29/755; 264/263; 264/272.15

[58] Field of Search ................. 29/857, 868, 749, 861, 29/858, 748, 755; 264/251, 263, 272.14, 272.15

[56] References Cited

U.S. PATENT DOCUMENTS 3,259,968 7/1966 Dyksterhouse .................. 29/755 X
4,126,935 11/1978 Rhines et al. ......................... 29/857
4,235,015 11/1980 Funcik et al. ......................... 29/857
4,253,222 3/1981 Brown et al. .
4,380,117 4/1983 Brandewie et al. ............. 29/749 X

FOREIGN PATENT DOCUMENTS 52486 5/1982 European Pat. Off. .

*Primary Examiner*—Mark Rosenbaum
*Assistant Examiner*—Carl J. Arbes

[57] ABSTRACT

A method and apparatus for injection molding a connector cover half of a connector staked to a flat multiconductor cable are disclosed, which injection molding is carried out by reciprocating an injection molding device toward and away from the cable and staking connector half diametrically opposite the injection molding device. Appropriate thermoplastic resin is chosen as the injection molding material, such that its melting temperature is lower than the softening temperature of the plastic of the staking connector half, so that when the front face of the staking connector serves as the front wall sealing off the die cavity of the injection molding device, no deformation of the staking connector half occurs. The forming die of the device may be either air cooled or water cooled, or both, to speed hardening and to prevent deformation of the staking connector half.

71 Claims, 7 Drawing Figures

METHOD AND APPARATUS FOR APPLYING A CONNECTOR HAVING AN INJECTION MOLDED COVER TO MULTICONDUCTOR CABLE

BACKGROUND OF THE INVENTION

This application is a continuation-in-part of prior application Ser. No. 351,595, filed Feb. 23, 1982.

In Applicant's copending Application, Ser. No. 351,595, filed Feb. 23, 1982, entitled "Method And Apparatus For Applying Two Piece Connector Blocks To Multiconductor Cable," which is hereby incorporated by reference, there are disclosed a plurality of connector feed assembly stations which can be used to attach two-piece connectors to flat multiconductor cable. Each connector feed assembly station is used to ram a half of a two-piece connector to a cable portion such that when the two halves are rammed toward each other with the cable portion sandwiched between the two connector halves, the half of the connector having contact pins for piercing through the insulation of the cable is staked to the conductors of the cable, with the other cover half of the connector being forced into engagement with the first staking connector half, to thus complete the attachment of the two-piece connector to a cable portion.

The apparatus disclosed in the aforesaid copending Application also has a carriage mounted for reciprocal movement above the plurality of connector feed assembly stations and in vertical alignment therewith, so as to position a cable portion at any of the connector feed assembly stations, where a particular type of connector is attached. Such connector may be either of the male type or the female type, for subsequent connection with a printed circuit board of a computer system, and the like.

Each connector feed assembly station of the aforesaid copending Application has a first ramming device for ramming the first staking connector half to a cable portion, and a second ramming device for ramming the connector cover half for insertion into the first staking half to cover the staking half and the portion of the cable attached thereto. Each ramming device has a reciprocal piston which has a piston ram head end surface that rams a respective cover half toward the other one mounted diametrically opposite. The piston head end surface is formed with a cut-out for receiving a die which receives the particular-shaped connector half for ramming it toward the other. The connector halves are stored in magazines, each of which has a lower opening cooperating with an access opening in the cylinder housing of the respective piston, so that as the piston reaches its backward-most retracted position, a connector half falls into the die at the ram head end surface for subsequent movement toward the cable portion and the other connector half.

The aforesaid apparatus also has a cutting mechanism for cutting the cable to form two ends of a precise cable length. Further, a microprocessor also controls the operation of the apparatus in a preprogrammable manner, so that any desired length of cable may be formed with any number of connectors attached thereto along its length, in any desired pattern or array.

In another copending Application of the Applicant, Ser. No. 496,461, filed May 20, 1983, entitled "Method And Apparatus For Attaching Single Piece Connectors To A Flat Multiconductor Cable," which is hereby incorporated by reference, there is disclosed a plurality of connector feed assembly stations for attaching single piece connectors to a flat multi-conductor cable. There is also disclosed a cutting mechanism for cutting the cable to define the ends of cable length, which cutting mechanism is mounted on the carriage for movement therewith as the carriage travels from one connector feed assembly station to another.

It is also disclosed in the aforesaid Applicant's copending Applicant, Ser. No. 496,461, that a marking station is provided in lateral alignment with the plurality of connector feed assembly stations, which marking station applies a mark or code on the cable length assemblies formed, which mark may be provided by sprayed ink, pressure sensitive tape, or dot matrix techniques.

In still another copending Application of the Applicant, Ser. No. 490,380, filed May 2, 1983, entitled "Testing Device For Testing The Connections Of A Connector And A Cable Portion Attached To The Connector," which is hereby incorporated by reference, there is disclosed a method and a system for testing each connection of a conductor of the cable to a respective staking pin of a connector attached to the cable, to ascertain defective connector attachments to the cable, such as short or open circuits. In the aforesaid testing method and system, reciprocable testing fingers are mounted in one of the feed devices of a connector feed assembly station for movement therewith toward and away from a cable portion positioned between the two feed devices of the asembly station. When a connector has been attached to a cable portion, the testing fingers, in the case of female connectors, are extended through the front face of its respective feed device, to contact the connections of the connector with the conductors of the cable, which fingers are in turn wired to a conventional testing instrument which tests for continuity. In the case of male connectors, the projecting testing fingers are replaced by a plate having a series of testing receptacles into which the male contact projections of the male connector extend for testing when the feed device in which the testing plate is mounted is moved toward the cable portion.

In all of the aforesaid copending Applications, the operation of the apparatus is carried out automatically by a microprocessor, which is preprogrammable to provide any desired cable lengths with any desired number of connectors attached thereto, in any desired array. The microprocessor also controls the operation of the cutting mechanism and the testing system, so that whenever a defective attachment has been detected by the testing system, the cutting mechanism is activated to cut away the defective attachment for subsequent disposal.

In the conventional two-piece connector which is attached to a cable portion, one half of the connector includes a plurality of staking pins corresponding in number to the conductors in the cable to be connected to the connector. A second cover half of the connector is mounted over the first connector half after the first half has been staked to the conductors of the cable portion. Such mounting of the second cover half to the first staking half is accomplished by a pair of projecting end tenons in the second cover half, which tenons are received in a pair of end mortises in the first staking half. As the second cover half is placed over the first staking half, each staking pin of the first staking half slides in a respective opening of the second cover half, for fixture therein. The second cover half and the first staking half sandwich therebetween the portion of the cable attached to the first staking half, so that when the tenons are forced into the pair of mortises in the first staking half, until each tenon is entirely in a respective mortise, the cable portion is held fast between the interior surfaces of the two halves of the connector.

SUMMARY OF THE INVENTION

It is the primary object of the present invention to provide an apparatus for attaching connectors to portions of flat multiconductor cable in which a part of each connector is formed by injection molding a cover over that part of the connector staked to a cable portion. Such injection molding of a cover of a connector provides a better seal for the staking pins and the cable portion to which the staking pins are attached, so that foreign matter and other harmful elements do not enter into the inside of the connector, thereby preventing corrosion of the metal staking pins and conductors of the cable, as well as to prevent exposure of the staking pins to the ambient surroundings. By injection molding the cover half of each connector, so that the injection molded cover half surrounds the staking pins of the connector half staked to the cable portion, as well as surrounding that portion of the cable staked to the staking half, an air-tight cover seal is provided. Further, injection molding the cover of the connector prevents accidental separation of the two connector halves from each other when in use at the site where the cable length is to be employed.

Since, in the present invention, there is no cover half rammed against the other staking half of the connector, which requires a pair of end tenons on the cover half which are slidingly received in a pair of end mortises of the staking half, the close tolerances required in that case is obviated in the present invention, since there are no closely-toleranced projecting tenons receivable in mortises of the staking half. Even if the ramming device of the staking half is misaligned, to a small degree, with respect to the injection molding device of the present invention, no defective attachment of the connector to a cable portion will result.

To the accomplishment of the above-noted advantages, the apparatus for applying injection molded connector halves of the present invention has an injection molding device at each connector feed assembly station. Each injection molding device is of conventional design and is mounted for reciprocal movement toward and away from the ramming device attaching the staking connector half to a portion of flat multiconductor cable. The injection molding device is aligned diametrically opposite to a respective ramming device used to attach a staking connector half to a cable portion, and is movable toward and away from that staking ramming device.

The injection molding device has a conventional heating cylinder in which is melted a supply of plastic provided from a hopper at one end of the heating cylinder. A plunger forces a requisite amount of the melted plastic into a forming die when the injection molding device has been extended, so that a staking connector half in the staking ramming device abuts against the front edge surfaces of the forming die, to thereby define a closed, sealed forming chamber into which the melted plastic is injected after the staking connector half has been staked to the conductors of the cable portion. The injection molding device is kept in its extended position for a short while, to allow cooling and hardening of the injected plastic, to thus form the connector cover half, which completely surrounds and seals the contact staking pins of the connector which project through the conductors of the cable portion after staking, as well as surrounding the portion of the cable to which the connector is staked along the width of the connector staking half.

The present invention also provides a forced air convection current to speed the cooling and, therefore, the hardening of the injected plastic within the forming die. Such forced air convection current may be provided by a conventional fan mounted to the apparatus of the present invention, so that it directs the air flow toward the point of attachment of the cable portion to a connector at each connector feed assembly station, which stations are in lateral alignment along a channel, which channel defines the exit passageway for completely assembled cable lengths. The fan may be operated only at such time as a connector is being attached to a cable portion.

The injection molded feed assembly station of the present invention may also be combined with single piece connector feed assemblies, as disclosed in aforesaid copending Application, Ser. No. 496,461, or with the two-piece connector feed assembly station, as disclosed in the aforesaid copending Application, Ser. No. 351,595. Further, a testing system may be employed in each injection molded feed station, as disclosed in aforesaid copending Application, Ser. No. 490,380, which testing system is provided within the ramming device for attaching the staking connector half to the cable portion of each feed station.

Also, the apparatus of the present invention may also be provided with a separate marking station for applying a mark, such as a code or stock number, to a cable assembly or length, as disclosed in aforesaid copending Application, Ser. No. 496,461.

Since the forming die of the injection molding device of the present invention is sealed off by the staking connector half, when both the connector staking half and the injection molding device have been moved toward each other to abut against each other with the cable portion sandwiched therebetween, it is necessary to choose an injection molding plastic that has a melting temperature below the softening, deformation temperature of the plastic of the staking connector half, so that during the injection molding of the connector cover half, the staking half is not deformed. The softening or deformation of the insulation of the multiconductor cable is not critical since the injected plastic is also an excellent electrical insulator. Deformation is further prevented by the provision of the forced air convection currents. For example, if the staking half be made of polyethylene plastic, then the cover half would be made using polypropylene resin. Any type of thermoplastic resin may be employed to form the cover half as long as it has a melting temperature below the deformation temperature of the staking half, or at least has a melting temperature that, when cooled in the forming die by the ambient air and by the forced air convection device, the time it takes to cool below the deformation temperature of the staking half is negligable, so that no deformation of the staking half occurs.

If the staking connector half be made of a thermoset, then most kinds of thermoplastic resins may be employed with the injection molding device of the present invention. Further, even in those instances where the injection molding plastic used has a melting temperature above the deformation temperature of the staking connector half, so that sufficient time in cooling is required and which would deform the staking half, the forming die may be further cooled by water cooling by providing a water jacket around the surfaces of the forming die itself.

The entire operation of the present invention is automatically controlled by a microprocessor, as disclosed in aforesaid copending Application, Ser. No. 351,595. In the present invention, the microprocessor also controls the air cylinder that reciprocates the injection molding device, at each feed station, and also controls the timing of the plunger extension of each injection molding device, so that the plunger does not inject the melted plastic until such time as the staking connector half has been, or is about to be, attached to the cable portion. The microprocessor is preprogrammable, so that any desired cable lengths may be formed with any desired array of connectors attached to portions of the cable length.

The apparatus of the present invention is also provided with a cutting mechanism mounted on a movable carriage in the direction parallel with the width of the cable, as disclosed in aforesaid copending Application, Ser. No. 496,461. The cutting mechanism is used to define the two ends of each cable assembly, as well as to cut away defective connector attachments discovered during the testing procedure for each connector attachment.

BRIEF DESCRIPTION OF THE DRAWING

The invention will be more readily understood with reference to the accompanying drawing, wherein.

DETAILED DESCRIPTION OF THE INVENTION

Figure 1:
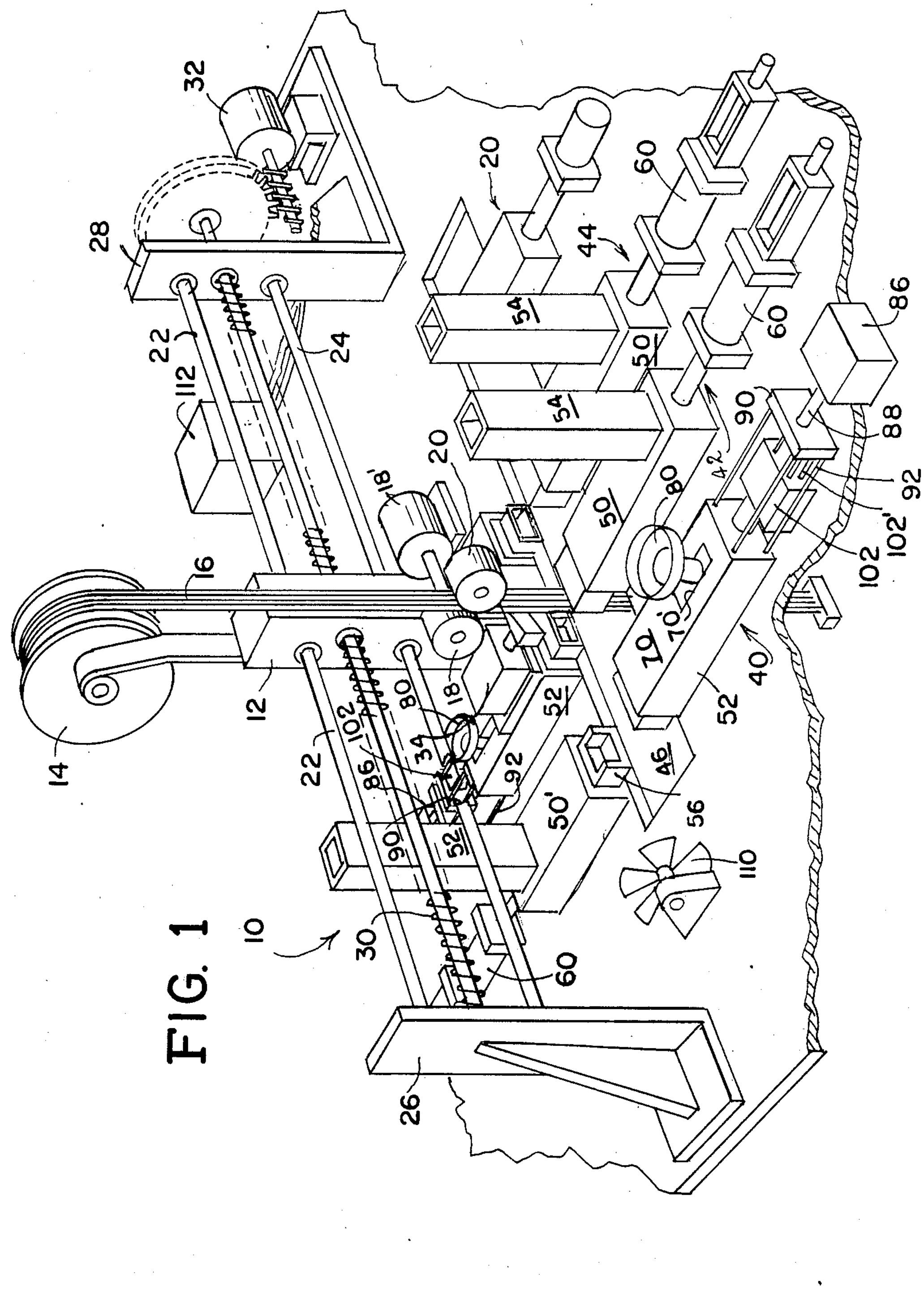
FIG. 1 is a perspective view of the apparatus for attaching connectors having injection molded covers to portions of flat multiconductor cable of the present invention.

Referring now to the drawing in greater detail, the apparatus for attaching connectors with injection molded covers is indicated generally by reference numeral 10 in FIG. 1. The apparatus 10 includes a translatable carriage 12 upon which is mounted a supply reel 14 of flat multiconductor cable 16 for advancement downwardly between a drive roller 18 and an idler roller 20. The carriage 12 is slidable on a pair of spaced, parallel guide rods 22, 24 mounted between mounting side brackets 26, 28. A threaded rod 30 is received in a threaded opening in the carriage 12, so that when a motor 32 is energized to rotate the threaded rod 30 through appropriate gearing, the carriage may be traversed in the direction along guide bars 22, 24, which is parallel to the width of the cable 16. Mounted on a lower mounting plate is a cutting mechanism 34 which has a cutter, which cutter is extendable toward and away from a portion of the cable 16, to cut the cable to define an end of a cable length. The cutter has an inwardly sloping cutting edge surface for shearing the portion of the cable to be cut as the cutter is extended. The cutting mechanism 34 moves along with the traversal of the carriage 12, so that cable portions may be cut at any location at which the carriage 12 is positioned. The above-described carriage and carriage moving means are disclosed in greater detail in above-noted Applicant's copending Application, Ser. No. 351,595, filed Feb. 23, 1982, entitled "Method And Apparatus For Applying Two Piece Connector Blocks To Multiconductor Cable." The above-described cutting mechanism mounted upon the carriage for movement with the carriage is disclosed in greater detail in above-noted Applicant's copending Application, Ser. No. 496,461, filed May 20, 1983, entitled "Method And Apparatus For Attaching Single Piece Connectors To A Flat Multiconductor Cable."

The rollers 18 and 20 advance a portion of the cable 16 downwardly to position it at a connector feed assembly station, where a connector is attached to the conductors of the cable. In FIG. 1, there are shown three such connector feed assembly stations 40, 42, 44 though one, two, or more than three such stations may be provided. Each feed station is in lateral alignment with another feed station along a channel 46, which channel 46 is parallel with the width of the cable 16. Such lateral, width-wise alignment allows for the carriage 12 to position portions of the cable at any desired feed station, while the rollers 18 and 20 advance that portion downwardly toward the station, until such portion is positioned between the two feed devices of each station.

Each connector feed assembly station 40, 42, and 44 has a pair of feed devices 50, 52 mounted on opposite sides of the channel 46 in a diametrically opposed relationship. The feed device 50 is for attaching a staking connector half to the conductors of a cable, which feed device 50 is disclosed in greater detail in Applicant's aforesaid copending Application, Ser. No. 351,595. The feed device 50 has a storage magazine 54 in which are placed a number of similar type staking connector halves. The storage magazine 54 has a lower exit opening cooperating with an opening formed in the housing 50′ for dropping a staking connector half onto a reciprocable piston head 56 which has a cut-out surface formed in its front ram head end surface for holding one such staking connector half for ramming it against a cable portion positioned at the feed station. Pneumatic means 60 drive the piston head for reciprocal movement, which piston head also has a sloping top surface for guiding the bottom-most one of the connector halves into the cut out of the ram head end surface 56 when the piston head is moved to its most rearward, retracted position.

Figure 5:
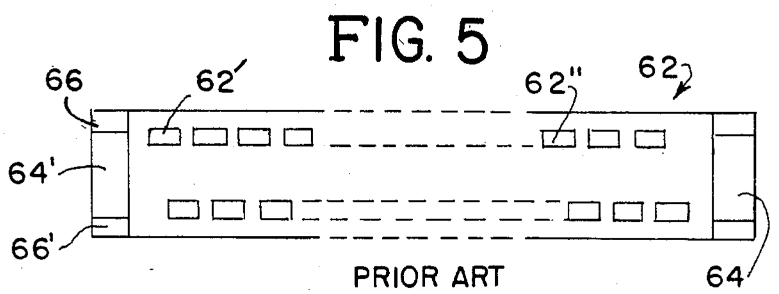
FIG. 5 is a plan view of a conventional staking connector half which is attached to a portion of flat multiconductor cable at the staking connector half feed device of the present invention.

The staking connector half 62 stored in a magazine 54 typically has a plurality of projecting staking pins 62′, as shown in FIG. 5. As shown, there are two such rows of staking pins 62′, each staking pin 62′ cutting through the insulation of the cable portion and contacting a conductor, so that each conductor of the cable is in contact with one such staking pin 62'. A staking pin 62' on one row is slightly laterally offset from a corresponding staking pin 62' in the other row a sufficient amount to correspond to the spacing of the conductors of the cable. The staking connector half 62 also has a pair of edge mortises 64, 64', with each mortise having upper and lower projections 66, 66'. The projections 66, 66' and the mortises 64, 64' are provided so that in the conventional assembly of a connector to a cable portion, a second connector cover half having projecting tenons is rammed into the first staking half, by forcing the tenons into the mortises of the first staking half, while a cable portion is sandwiched between the two halves, as disclosed in greater detail in Applicant's aforesaid copending Application, Ser. No. 351,595. It is noted that on the other end of the connector 62, remote from the face having the staking pins 62' thereon, there are provided output contacts for subsequent connection of the connector to a printed circuit board, or the like, in the system for which a cable length assembly having connectors attached thereon is prepared. Further, it is noted, that each staking pin 62' has a U-shaped cross-section with each pin having a pair of projecting cutting contact points for piercing through the insulation of the cable and into contact with a respective conductor of the cable. The U-shaped staking pins are, in turn, extended rearwardly from the front face of the connector having the staking pins projecting therefrom, to the rear face, where the above-noted output contacts are formed. Thus, the output contact and the U-shaped staking pin of each staking element 62' are one, integrally formed piece. Further, the portion of the staking element extending rearwardly to form the output contact is typically made of a hollow construction, so that there is a passageway formed within each staking element from the front U-shaped pin to the rearward output contact, which passageway extends entirely through the staking element. In FIG. 5, such passageway is indicated by reference numeral 62".

Whereas in Applicant's aforesaid copending Application, Ser. No. 351,595, the connector half 62 is rammed against the cable portion opposite a second connector cover half, which second connector half is also rammed toward the cable portion by its own piston head to thus provide the counter, reactive force for staking the connector half 62 to the conductors of the cable, in the present invention the second connector cover half is formed during the staking procedure itself by an injection molding device. To provide the reaction force for the staking connector half, the forming die of the injection device is used.

Figure 3:
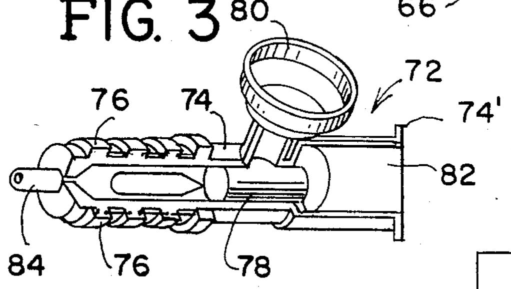
PRIOR ART FIG. 3
FIG. 3 is a partial sectional view showing a conventional injection molding device used in the connector feed device of FIG. 2.

As shown in FIG. 1, each feed station 40, 42, 44 has a feed device 52 that injection molds a cover half for the staking connector half 62. Each feed device 52 has a stationary housing 70 in which is mounted for reciprocal motion a conventional injection molding device. The conventional injection molding device 72 (FIG. 3) has a heating chamber or cylinder 74 with a plurality of circumferentially spaced and parallel heating elements 76 which heat the interior of the cylinder 74 to melt plastic supplied therein. A plunger 78 is forced inwardly against a previously supply of plastic fed into the interior of the cylinder by a hopper 80 by means of a main ram 82. As the plunger 78 forces a measured amount of the plastic into the heating chamber of the cylinder, the plastic already melted in that heating chamber is forced out of the cylinder through a nozzle 84.

Figure 2:
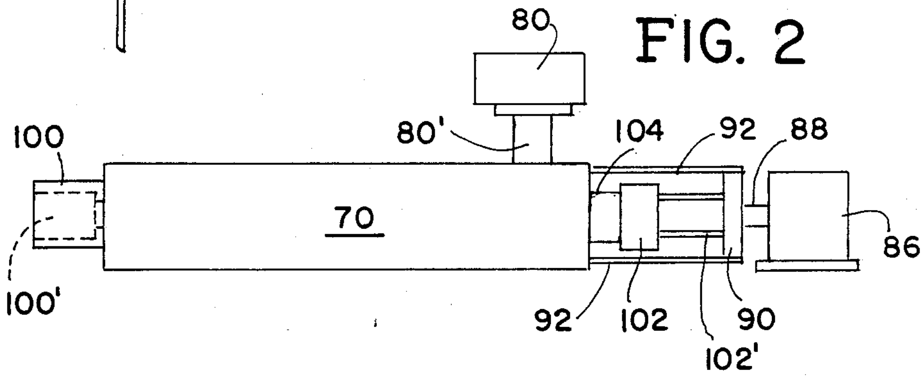
FIG. 2 is a side view of an injection molded connector cover feed station of the present invention.

As shown in FIG. 2, the injection molding device 72 is reciprocated within its housing 70 by an air cylinder 86 having a piston 88 fixedly connected to a plate 90. The plate 90 has four corner connecting rods 92 which project through appropriate openings in the rear face of the housing 70 for fixed attachment to ring flange 74' (FIG. 3) of the cylinder of the injection molding device, so that with reciprocation of the piston 88 and plate 90, the injection molding device 72 will slide within the housing 70. The housing 70 also is provided with a slot 70' (FIG. 1) through which a chute 80' of the hopper 80 projects, so as to allow for the movement of the injection molding device relative to its housing 70. The slot 70' need only be a few inches in length, since the stroke of the piston 88 is short, depending only upon the length of the necessary extension of the injection molding device's forming die 100 against the cable portion and against the extended first staking connector half.

In order to operate the main ram 82 of the injection molding device to extend the plunger 78, a separate air cylinder 102 is provided with a piston 104, which forms the main ram 82 in the interior of the injection molding device. The air cylinder 102 is also fixedly connected to the reciprocating plate 90 via four corner rods 102', so that when the plate 90 moves to move the injection molding device within the housing 70, the main ram 82 and plunger 78 are also moved the same amount, to provide the necessary fixed relationship between the parts of the injection molding device. Though not shown, the injection molding device 72 is slidingly mounted within its housing 70 by conventional structure.

As mentioned above, the nozzle 84 directs the melted plastic into the forming die of the device, in the conventional fashion. In the present invention, the forming die 100 has a cavity 100' which is defined by rear, upper, lower, and side interior surfaces. The forming die 100 is open at its front, so that it may be sealed off upon extension of the injection molding device against the cable portion and against the staking connector half supported in the piston ram head end surface of the first feed device 50. Thus, when the staking connector half 62 and the forming die 100 are abutting against each other with the cable portion sandwiched therebetween, the melted plastic is forced out through the nozzle 84 into the thus-sealed forming die, to thus form the cover half of the connector directly on the staking connector half already staked to the conductors of the cable portion. As the melted plastic is injected into the cavity 100', with the front face of the connector half 62 sealing off the cavity, the injected plastic surrounds all of the U-shaped staking pins 62', and will also coat the portion of the cable staked to the staking connector half and positioned between the corner posts 66 of the connector half 62, so that additional insulation is provided for the cable portion. It is noted that the passageways 62" of each staking element is also sealed off, since the cable portion is positioned between the flow of the injected plastic and the opening of each passageway 62", so that no melted plastic flows through the passageways, which could cause impairment of the connector's connections with the printed circuit board, or the like, when such connector is later employed in a system.

Figure 4:
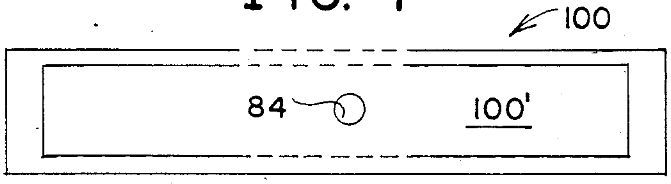
PRIOR ART FIG. 4
FIG. 4 is an end view of the forming die of the injection molded connector cover feed station of FIG. 2.
Figure 6:
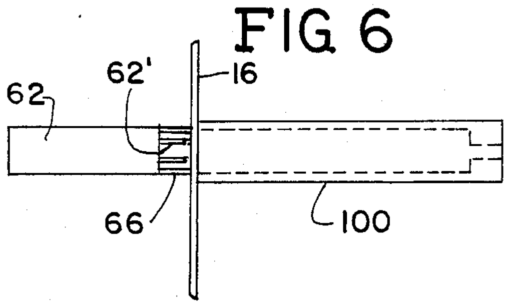
FIG. 6 is a partial side view showing a portion of flat multiconductor cable sandwiched between the forming die of FIG. 4 and a staking connector half of FIG. 5 during the formation and attachment of a complete connector to a cable.

Viewing FIG. 4, the outer width of the forming die 100 is such that it is slightly less than the width of the staking connector half 62, as taken from one upper corner post 66 to the other upper corner post 66 in FIG. 5, so that when the forming die abuts against the connector half 62, it lies within the corner posts 62, so that no melted plastic will flow through the mortises 64, 64'. The height of the cavity 100' is such that it completely encompasses the two rows of staking pins 62', for the projection into the interior of the cavity of the staking pins 62'. Further, the cavity 100' has a height such that the front edge surfaces of the forming die 100 abut against the front face of the staking connector half 62 above and below the rows of staking pins 62'. Preferably, the cavity 100' is of such size that the completed cover half of the connector which is injected molded lies as close as possible to the inner edge surfaces of the corner posts 66 and as close as possible to the upper and lower edges of the front face of the staking connector half, so that as large a cover half as possible is provided. Further, the depth of the cavity 100' also is such that the entire length of each staking pin is positioned therein, so that the molded cover half will extend beyond the projection of each staking pin, as, for example, extending to the tip of the projection of each corner post 66, so that the rear surface of the completed cover half lies flush with the projecting end edge surface of the posts 66.

It is, of course, to be understood, that were a differently designed staking cover half used instead of the staking half 62 illustrated in FIG. 5, the shape and dimensions of the forming die 100 and its cavity 100' would be modified to accommodate such different staking connector half. For example, if a staking connector half be used that does not have the corner posts 66, then the forming die may be lengthened at the corners thereof. Other suitable configurations may be provided for any staking connector half employed, as long as the staking pins thereof are surrounded by the forming die and project into the interior of the cavity 100', so that the molded cover half completely surrounds each staking pin along the length of its projection from the front fact of the staking connector half.

As shown in FIG. 1, the apparatus 10 is also provided with a fan 110, which fan is mounted along the mid-line of the channel 46, so as to direct forced air convection currents along the mid-line of the channel directly toward the locations where connectors are attached to cable portions at the feed stations 40, 42 and 44. The forced air convection currents will cool off the forming die 100 immediately after the injected melted plastic has been injected into the cavity 100', so as to hasten hardening of the cover half of the connector. The fan 110 is preferably controlled by microprocessor 112, which microprocessor also controls the operations of the drive roller motor 18', motor 32, air cylinders 60, 86 and 102 through appropriate conventional valves, and cutting mechanism 34, as disclosed in Applicant's aforesaid copending Application, Ser. No. 351,595. Fan 110 is preferably energized just prior to the injection of the melted plastic into the cavity 100'.

In operation, the carriage 12 is moved along guide rods 22, 24 until it is positioned above one of the feed stations 40, 42 and 44, at which point a portion of the cable advanced by the rollers 18, 20 is positioned for attachment of a connector thereto. Then, the feed devices 50 and 52 are activated to extend their respective elements, so that the piston head 56 is forced against the cable portion simultaneously with the movement of the forming die, as the injection molding device is extended by its control mechanism. As the forming die and front face of staking connector half supported in the piston head 56 abut against each other, the cable portion sandwiched between the two will be staked to the projecting staking pins of the staking connector half, with the pins extending completely through the insulation of the cable portion, and with a respective conductor being seated between the legs of a respective U-shaped staking pin, so that the staking pins project outwardly from the side of the cable portion facing the injection molding device 72. With the staking connector half thus staked to the cable portion, and with the front face of the staking connector half abutting against the forming die and sealing off the cavity 100', along with the cable portion extending across the opening of the cavity, the melted plastic is injected into the cavity 100', where it is formed into the desired cover, and where it is speedily cooled by the air convention currents from the fan 110, which was activated upon the staking of the staking connector half to the cable portion. It is preferable that the fan 110 not be activated until the cable has been staked to the staking connector half, so that no lateral movement of the cable be caused, which could cause misalignment between the conductors of the cable and the staking pins of the connector half.

After the cover half has been molded, the respective air cylinders are de-activated to return the feed devices 50 and 52 to their retracted rest positions until the next connector is to be attached to another cable portion. Upon retraction of the feed devices, the fan 110 is de-energized by microprocessor 112.

Since the staking connector half 62 is made of plastic, the kind of plastic used in the injection molding of the cover half must be chosen so as not to cause any deformation in the staking connector half, since the front fact of the staking connector half serves as the front surface sealing wall of the cavity 100' during the injection molding of the cover half. Thus, the plastic for the injection molded cover half must have a melting temperature less than the deformation of the plastic of the staking connector half. The particular injection molded plastic resin chosen will entirely depend upon the plastic from which the staking connector half is made.

If the staking connector half be made of the polyolefin resin polypropylene, then the injected plastic resin may be the polyolefin resin low density polyethylene, since the polypropylene has a softening or deformation temperature of about 160° Centigrade, while the low density polyethylene has a melting temperature of about 115° Centigrade. Even high density polyethylene may be used in such a case. If the staking connector half be made of a thermoset resin, all of which have high softening temperatures, then just about all thermoplastic resins may be used for injection molding the cover half. Such thermoplastic resins that may be used for the cover half are: methylpentene polymer, which is the lightest thermoplastic, which as a melting point of about 240° Centigrade and deforms at about 200° Centigrade; polytetrafluoroethylene resin which has deformation temperature of about 260° Centigrade; chlorinated polyether, which has a deformation temperature of about 120° Centigrade; polyvinyl carbazole resin, which deforms at about 150° Centigrade. Even condensation polymers may be used, such as polycarbonates, which have softening temperatures of about 150° Centigrade. Clearly, the staking connector half can be manufactured itself using a plastic having a high deformation temperature such as a thermoset resin, so that all of the thermoplastic resins may be used to injection mold the cover half.

Figure 7:
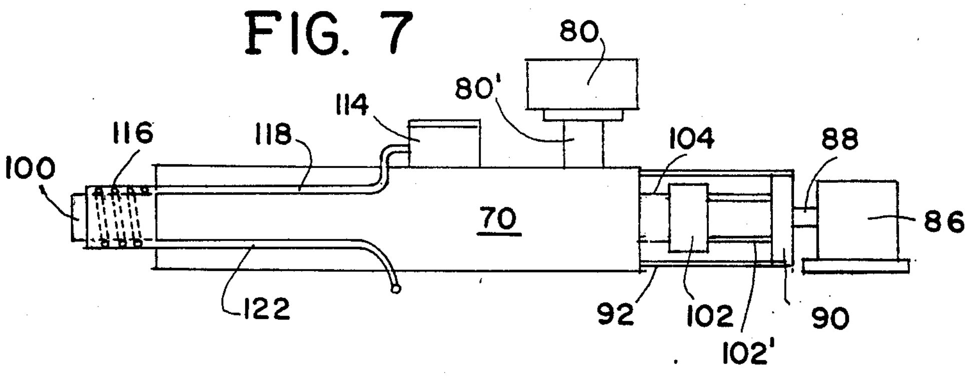
FIG. 7 is a sideview of the injection molded connector station of FIG. 2 with the provision of a water-cooling jacket for the forming die.

In those cases when the deformation temperature of the plastic of the staking connector half is below the melting temperature of the injection molding plastic resin, deformation of the staking half still need not occur if the forced air convection, produced by the fan 110, for all practical purposes, cools the die 100 sufficiently fast so as to prevent any such deformation from occuring. Further, to insure that no such deformation takes place, the die 100 can be cooled further by a water jacket, as shown in FIG. 7. In this instance, a supply of water, such as a miniature water tank 114, mounted on the housing 70, may be used to feed water to a water jacket 116 surrounding the upper, lower and side surfaces of the die 100. A hose inlet line 118 feeds fresh water to the jacket upon each extension of the injection molding device toward the cable portion, while an outlet hose line 122 removes the heated water from the previous molding operation. A conventional flow valve operated in response to the movement of the injection molding device is employed to open the flow of water to the jacket when extension of the injection molding device is carried out, which water is fed by gravity. Upon the return of the device, the flow valve is closed to shut off the flow of water.

The time needed to inject the melted plastic into the cavity and allow the plastic to harden to form the connector cover is extremely short, especially when the forced air convection currents and the water jacket are employed. The time required need not be any longer than now required to attach two-piece connectors using the apparatus disclosed in Applicant's aforesaid copending Application, Ser. No. 351,595.

The apparatus of the present invention may also include separate feed stations employing the two-piece connector feed assembly station disclosed in the aforesaid copending Application, Ser. No. 351, 595, and may also employ single piece connector feed assembly stations disclosed in the aforesaid copending Application, Ser. No. 496,461, so that a cable length assembly having a hybrid of two-piece connectors, single piece connectors, and/or connectors with injection molded covers is provided. Further, testing means may also be provided for each feed station, 40, 42, 44 as disclosed in Applicant's aforesaid copending Application, Ser. No. 490,380, filed May 2, 1983. The testing means are mounted in each of the feed devices 50 where projection fingers or receptacles are brought into contact with the contacts of a female or male connector, respectively, via openings in the piston head. Each finger or receptacle is wired to a testing instrument. Also, a marking station 120 (FIG. 1) as disclosed in the aforesaid copending Application, Ser. No. 496,461, may also be provided for applying a code or other information on cable length assemblies.

It is also noted that the arrangement of the feed devices 50 and 52 at each station may be reversed, so that the same type connectors may be attached to different cable portions 180° out of phase, as occurs at the feed station 40 when compared with the feed station 42.

While specific embodiments of the invention have been shown and described, it is to be understood that numerous changes and modifications may be made therein without departing from the scope nd spirit of the invention as set out in the appended claims. For example, the injection molding device 72 may be mounted stationarily with the forming die 100 overhanging into the center of the channel 46.

What is claimed is:

1. A method of attaching at least one connector to a flat multiconductor cable, said method comprising:

staking a first connector half to a portion of a flat multiconductor cable which includes a plurality of spaced conductors covered with insulation such that contact pins of the first connector half contact corresponding conductors of the cable; and molding an insulating second connector half to the staked first connector half, whereby a complete connector staked to a portion of a flat multiconductor cable is provided.

2. The method according to claim 1, wherein said step of molding comprises advancing material which has been plasticized by heat and pressure into contact with the staked first connector half and the portion of the cable thereadjacent.

3. The method according to claim 2, wherein said step of staking the first connector half comprises advancing the connector half until the first connector half and cable portion abut against a forming die to provide a reaction force to stake the contact pins of the first connector half to the conductors of the flat multiconductor cable.

4. The method according to claim 3, wherein said molding step includes injecting the plasticized material into the forming die after the first connector half has been staked to the conductors of the flat multiconductor cable such that the plasticized material is molded at least partially around the portion of the cable staked to the first connector half, the contact pins of the first connector half, and a part of the first connector half facing the forming die to form the second connector half.

5. The method according to claim 4 further including the step of removing the molded connector half from the forming die after the plasticized material in the forming die has hardened.

6. The method according to claim 1, further comprising staking another first connector half to another cable portion and molding another second conductor half to the another first connector half to provide a flat multiconductor cable assembly having a plurality of connectors attached along the length thereof.

7. The method according to claim 1, further comprising a step of initially cutting the cable to define an end thereof.

8. The method according to claim 1, further comprising a step of terminally cutting the cable to define an end thereof.

9. The method according to claim 3, wherein said step of molding comprises injecting plastic softened under heat and pressure into the forming die during the staking of a first connector half to the conductors of the flat multiconductor cable, the portion of the cable being staked to the first connector half and a part of the first connector half serving to seal the forming die to form a closed, completed injection molding die which forms the second connector half.

10. The method according to claim 1, further comprising attaching a two-piece connector to another portion of the cable , whereby a cable length is provided with a connector having a molded cover and a two-piece connector.

11. The method according to claim 10 further including translating the cable between a work station at which the connector with the molded cover is attached and a work station at which the two-piece connector is attached.

12. The method according to claim 11 further including advancing the cable along its length between the steps of staking the first connector half and attaching the two-piece connector.

13. The method according to claim 10, wherein the two-piece connector attaching step is carried out after said step of molding a second connector half.

14. The method according to claim 10, wherein the two-piece connector attaching step is carried out prior to said step of staking the first connector half.

15. The method according to claim 10, further comprising repeating at least one of said step of molding a second connector half and said step of attaching a two-piece connector to provide a cable assembly with at least one injection molded connector half and at least one two-piece connector in any desired combination and number.

16. The method according to claim 1, further comprising attaching a single piece connector to another portion of the flat multidconductor cable, whereby a cable length is provided with a connector having a molded connector half and a single piece connector.

17. The method according to claim 10, further comprising attaching a single piece connector to another portion of a flat multiconductor cable, whereby a cable length is provided that has a connector having a molded half, a two-piece connector, and a single piece connector attached thereto along its length.

18. The method according to claim 1, further comprising the step of testing connections between the contact pins of the first connector half with the conductors of the cable to which the contact pins are staked for continuity.

19. The method according to claim 10, further comprising the step of testing connections between the contact pins of each connector with the conductors of the cable to which the contact pins are staked for continuity after each step of attaching the two-piece connector.

20. The method according to claim 17, further comprising the step of testing connections between the contact pins of each connector with the conductors of the cable to which the contact pins are staked for continuity after each step of attaching the single piece connector.

21. The method according to claim 1, wherein said step of molding a second connector half comprises heating plastic to its melting point which is below a softening temperature of the first connector half.

22. The method according to claim 1, wherein said step of molding comprises molding the second connector half with a plastic having a melting temperature lower than the softening and deformation temperature of the first connector half.

23. The method according to claim 3, wherein said step of molding comprises cooling the forming die.

24. The method according to claim 23, wherein said forming die cooling step includes directing a forced air convection current such that when the first connector half is being staked to the conductors of the cable, the forced air convection current impinges on that part of the first connector half being attached to the cable, so that when the second connector half is molded the plasticized material cools rapidly.

25. A metod of attaching at least one connector to a flat multiconductor cable, which flat multiconductor cable has a plurality of parallel, spaced-apart conductors covered by insulation, said method comprising:

positioning a portion of the flat multiconductor cable which is to receive a connector at a connector station;

staking a first connector half to the flat multiconductor cable portion positioned at the connector station such that contact pins of the first connector half contact the conductors of the cable;

at least partially covering the first connector half and the cable portion staked to the first connector half with a thermosetting plastic substance, whereby a complete connector staked to a portion of a flat multiconductor cable is provided; and testing the contact between the contact pins and the cable conductors for shorts and open circuits.

26. The method according to claim 25, further comprising the step of cutting away a portion of a flat multiconductor cable which said step of testing has indicated to be defective.

27. The method according to claim 25, wherein said step of testing comprises moving a plurality of testing fingers into contact with the contact pins, whereby a female connector may be tested for continuity.

28. The method according to claim 25, wherein said step of testing comprises inserting the contact pins into engagement with receptacles of a testing plate member after the first connector half has been staked to the cable, whereby a male connector may be tested for continuity.

29. A method of forming cable assemblies, the method comprising:

selectively advancing a multiconductor cable which includes a plurality of conductors separated by insulation;

selectively attaching electrically conductive portions of a first connector to the multiconductor cable such that the electrically conductive portions are connected in an electrically conductive relationship with the cable conductors;

covering at least a portion of the connector electrically conductive segments, the first connector, and the multiconductor cable thereadjacent with a flowable material which sets to a substantially solid state; and, allowing the flowable material to set to its substantially solid state.

30. The method as set forth in claim 29 wherein the advancing, attaching, covering, and setting steps are repeated a plurality of times to form a cable assembly having a plurality of connectors attached thereto.

31. The method as set forth in claim 29 wherein the fluid material comprises a thermosetting plastic substance.

32. The method as set forth in claim 29 further including the step of testing for an electrically conductive relationship between the connector electrically conductive segments and the cable conductors.

33. A method of continuously and automatically forming cable assemblies, the method comprising:

(a) under the control of a computer, advancing a multiconductor cable longitudinally a selected distance;

(b) under the control of the computer, selectively staking a connector portion to the multiconductor cable such that electrically conductive segments of the connector portion are staked in an electrically conductive relationship with conductors of the multiconductor cable;

(c) testing for the electrically conductive relationship between the connector electrically conductive segments and the cable conductors;

(d) in response to the testing step indicating a defect, cutting the multiconductor cable adjacent the staked connector portion to severe the defectively staked connector half therefrom;

(e) under the control of the computer, selectively repeating steps (a), (b), (c) and (d) to form a cable assembly with connectors affixed at selected positions therealong; and (f) under the control of the computer, selectively cutting the multiconductor cable to severe the cable assembly therefrom.

34. The method as set forth in claim 33 further including the step of covering at least a portion of the connector electrically conductive segments,, the connector half, and the multiconductor cable thereadjacent with a thermosetting plastic material.

35. An apparatus for attaching connectors to a flat multiconductor cable, the apparatus comprising:

an attaching means for selectively attaching a first connector portion to a flat multiconductor disposed thereadjacent;

a molding means operatively connected with the attaching means for selectively molding a second connector portion attached to the first connector portion and a portion of the flat multiconductor cable disposed thereadjacent; and, a positioning means operatively connected with attaching means and the molding means for selectively positioning the flat multiconductor cable adjacent the attaching means and the molding means in an operative relationship therewith, whereby a first connector portion is attached to the flat multiconductor cable and a second connector portion is molded to the first connector portion and a cable portion thereadjacent.

36. The apparatus according to claim 35, wherein said molding means and said attaching means are mounted diametrically opposite to each other on a frame assembly.

37. The apparatus according to claim 36, wherein said attaching means comprises at least one piston head in which the first connector portion is supported for reciprocating movement into contact with the adjacent flat multiconductor cable to be attached thereto; and said molding means comprises at least one injection molding device, and means reciprocally mounting said at least one injection molding device with the frame assembly for movement toward and away from said attaching means such that concurrently with a first connector portion being attached to the flat multiconductor cable, the injection molding device molds the second connector portion to the first connector portion and the flat multiconductor cable thereadjacent.

38. The apparatus according to claim 37, wherein said at least one injection molding device comprises a forming die into which melted plastic is injected for molding the second connector portion, said forming die having a rear surface wall, first and second side surface walls extending forwardly from said rear surface wall, an upper surface wall extending from the rear surface wall forwardly, and a lower surface wall parallel with said upper surface wall and extending forwardly from the rear surface wall, said forming die having an open front face at which a part of the first connector portion supported on said at least one piston head selectively abuts so as to close off said forming die to provide a closed, tight mold for the melted plastic injected into said forming die.

39. The apparatus according to claim 38, wherein the first connector portion which abuts against said forming die at the open front face thereof includes a plurality of staking pins which are staked to the conductors of the multiconductor cable as the piston head reciprocates.

40. The apparatus according to claim 39, wherein said forming die is aligned with said piston head such that the staking pins of the first connector portion are received in said forming die when said injection molding device and said piston head are moved toward each other.

41. The apparatus according to claim 35, further comprising means for cooling said molding means when said molding means is forming the second connector portion, the cooling means being operatively connected with the molding means.

42. The apparatus according to claim 40, wherein the injection molding device includes means for cooling said forming die, the cooling means being operatively connected with the forming die.

43. The apparatus according to claim 42, wherein said means for cooling comprises means for generating forced air convection currents.

44. The apparatus according to claim 35, further including a plurality of connector attaching means and a plurality of oppositely disposed molding means, the attaching and molding means being operatively connected with the positioning means for selectively being positioned in operative association with the multiconductor cable.

45. The apparatus according to claim 44, wherein said plurality of connector attaching means and molding means are aligned in an array extending generally traverse to the flat multiconductor cable positioned thereadjacent by said positioning means.

46.

The apparatus according to claim 45, wherein said positioning means comprises a carriage means operatively connected with a frame assembly with which the attaching and molding means are operatively connected for translating movement generally parallel to the array of connector attaching and molding means, means for translating said carriage means operatively connected with the carriage means and the frame assembly, and means operatively connected with the carriage means for advancing the cable longitudinally, whereby selected portions of the cable are brought into alignment with selected connector attaching and molding means.

47. The apparatus according to claim 46, further comprising a microprocessor for controlling the operations of said carriage translating means, said advancing means, and said plurality of connector attaching and molding means in a desired preprogrammable manner, the microprocessor being operatively connected with the translating means, the advancing means, and the attaching and molding means.

48. The apparatus according to claim 35, further comprising at least one two-piece connector attaching station operatively connected to the positioning means for selectively being positioned adjacent the multiconductor cable.

49. The apparatus according to claim 48, wherein said positioning means includes a carriage means operatively connected with a frame assembly which is operatively connected with the two-piece connector attaching means for translating movement selectively into registration with the two-piece connector attaching station and the attaching and molding means.

50. The apparatus according to claim 49, wherein said means for positioning further comprises means for advancing cable in a direction advancing being mounted on said carriage means for translating movement therewith.

51. The apparatus according to claim 50, wherein said means for positioning further comprises means for cutting a portion of the cable, said means for cutting being mounted on said carriage means for movement therewith.

52. The apparatus according to claim 35, further comprising at least one single piece connector attaching station operatively connected with the positioning means to be brought into registration with the multiconductor cable therefrom.

53. The apparatus according to claim 52, wherein said positioning means comprises a carriage means operatively connected with a frame assembly for translating movement relative thereto, the single piece connector attaching station and the attaching and molding means being operatively connected with the frame assembly, means operatively connected with the carriage means and the frame assembly for translating said carriage means, and means operatively connected with the carriage means for longitudinally advancing the cable whereby cable portions are selectively brought into registration with the single piece connector attaching station and the attaching and molding means.

54. The apparatus according to claim 52, further comprising at least one two-piece connector attaching station operatively connected with the single piece connector attaching station and the attaching means in a lateral alignment therewith.

55. The apparatus according to claim 54, further comprising a microprocessor for automatically controlling the operations of said connector attaching stations, said microprocessor also controlling the operation of said positioning, connector attaching, and molding means, so that any desired arrangement of connectors may be attached to a cable length in a preprogrammable and desired manner.

56. The apparatus according to claim 53, wherein said means for positioning further comprises means for cutting the cable, the cutting means being mounted to the carriage means.

57. The apparatus according to claim 35, further including means for testing for electrical interconnection between the connector portion and the flat multiconductor cable.

58. The apparatus according to claim 57, wherein said attaching means includes a piston head operatively connected with the molding means for reciprocal movement theretoward and therefrom to stake the first connector portion to the flat multiconductor cable.

59. The apparatus according to claim 58, wherein said testing means comprises projection fingers which are extendable through openings formed in the piston head for insertion into contact points of the first connector portion, and means for reciprocating said projection fingers for extension through and retraction from said openings, the reciprocating means being operatively connected with the projection fingers and the piston head, each of said projection fingers being electrically connected to a testing device to test for continuity.

60. The apparatus according to claim 58, wherein said testing means includes a plate having a plurality of contact receptacles thereon, said contact receptacles being in alignment with a plurality of openings formed in the piston head, so that contact projections of the first connector portion selectively enter into said plurality of contact receptacles for contact therewith; each of said plurality of contact receptacles being electrically connected to a testing instrument to test for continuity.

61. An apparatus for forming cable assemblies, the apparatus comprising:

a cable supply frame assembly;

a cable advancing means operatively connected with the cable supply frame assembly for advancing multiconductor cable downward therefrom;

a work station frame assembly;

a plurality of work stations operatively connected with the work station frame assembly in a generally transverse array, the work stations including at least:

- a first connector inserting means operatively connected with the work station frame assembly for selectively inserting electrically conductive segments of a first connector portion into a portion of the multiconductor cable disposed thereadjacent such that the electrically conductive segments are inserted in an electrically conductive relationship with the electrical conductors of the cable;
- a second connector inserting means operatively connected with the work station frame assembly for selectively inserting electrically conductive segments of a second connector portion into the multconductor cable portion disposed thereadjacent such that the second connector portion electrically conductive segments are inserted in an electrically conductive relationship with the cable conductors;
- an applying means operatively connected with the work station frame assembly for selectively applying a plastic which sets hard to at least a portion of the electrically conductive segments of at least one of the first and second connector portions and the multiconductor cable portion disposed thereadjacent;
- a translating means operatively connected with the work station frame assembly for selectively translating the cable supply frame assembly and the work station frame assembly relative to each other generally parallel to the work station array;
- a cutting means operatively connected with the work station frame assembly for selectively cutting the multiconductor cable to define ends of the cable assemblies; and,
- a control means for selectively controlling the advancing means, the translating means, the first connector inserting means, the second connector inserting means, and the applying means such that connectors are selectively connected to the multiconductor cable at selected relative displacements therealong, the control means being operatively connected with the advancing means, the translating means, the second connector inserting means, and the applying means.

62. The apparatus as set forth in claim 61 wherein the work station array further includes work stations for attaching single piece and two-piece connectors to the multiconductor cable.

63. An apparatus for forming cable assemblies, the apparatus comprising:

cable advancing means for selectively advancing a multiconductor cable longitudinally;

an attaching means for selectivity attaching a connector portion to the multiconductor cable such that electrically conductive segments of the connector portion are electrically connected with conductors of the multiconductor cable, the attaching means being operatively connected with the advancing means downstream thereof to receive advanced multiconductor cable thereadjacent; and, an applying means for selectively applying a fluid material which sets up to at least a portion of the connector portion, the electrically conductive segments, and the multiconductor cable adjacent the attached connector portion, the applying means being operatively connected with the advancing means and disposed downstream therefrom to receive advanced mutliconductor cable thereadjacent.

64. The apparatus as set forth in claim 63 wherein the setting fluid comprises a thermoplastic material which sets to a solid state as it cools from an elevated temperature and wherein the applying means includes means for heating the thermoplastic material to a softened state.

65. The apparatus as set forth in claim 64 wherein the applying means further includes a forming die which defines a die cavity therein, the forming die being disposed contiguous with the attaching means such that at least a portion of the electrically conductive segments are received therein and at least a portion of the connector portion and the multiconductor cable thereadjacent are disposed contiguous with the forming die cavity, the applying means further including means for supplying heated thermoplastic material to the forming die cavity, the thermoplastic material supply means being operatively connected with the forming die and with the heating means.

66. An apparatus for forming cable assemblies, the apparatus comprising:

advancing means for selectively advancing a multiconductor cable through a work station;

a connector attaching means for selectively attaching a first connector to a portion of multiconductor cable disposed thereadjacent in a electrically conductive relationship therewith, the connector attaching means being operatively connected with the work station;

thermoplastic material applying means for applying a thermoplastic material to at least a portion of the attached connector and the adjacent multiconductor cable portion, the thermoplastic material applying means being operatively connected with the work station generally opposite to the connector attaching means; and, cutting means for selectively cutting the multiconductor cable to define ends of the cable assembly, the cutting means being operatively connected with the work station.

67. The apparatus as set forth in claim 66 further including testing means for testing for an electrically conductive relationship between the connector and the multiconductor cable.

68. An apparatus for forming cable assemblies, the apparatus comprising:

an advancing means for selectively advancing a multiconductor cable which has a plurality of electrical conductors separated by insulation through a work station, the work station being operatively connected with the advancing means;

a connector attaching means for selectively inserting electrically conductive segments of a connector into the multiconductor cable in an electrically conductive relationship with the cable conductors, the attaching means being operatively connected with the work station; and, a testing means for testing for an electrically conductive relationship between selected electrically conductive segments and cable conductors.

69. The apparatus as set forth in claim 68 wherein the testing means includes a plurality of electrically conductive fingers which are mounted for reciprocating movement and reciprocating means for selectively reciprocating the electrically conductive fingers into and out of contact with the electrically conductive segments.

70. The apparatus as set forth in claim 68 wherein the testing means includes a plurality of receptacles disposed opposite the multiconductor cable from the connector attaching means, the receptacles selectively receiving the inserted electrically conductive segments therein, the receptacles being operatively connected with the work station.

71. The apparatus as set forth in claim 68 further including means for applying a material which hardens from a softened state at least to a portion of the electrically conductive segments, the connector, and the multiconductor cable thereadjacent in the softened state, the applying means being operatively connected with the work station.

* * * * *